United States Patent
Zhang et al.

(10) Patent No.: US 9,807,450 B2
(45) Date of Patent: Oct. 31, 2017

(54) APPARATUS AND METHOD FOR MEDIA PLAY IN HOME NETWORK

(71) Applicant: Huawei Device Co., Ltd., Shenzhen (CN)

(72) Inventors: Yajun Zhang, Shenzhen (CN); Zhenwei Shan, Shenzhen (CN); Yu Zhu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 15/100,587

(22) PCT Filed: Nov. 29, 2013

(86) PCT No.: PCT/CN2013/088162
§ 371 (c)(1),
(2) Date: May 31, 2016

(87) PCT Pub. No.: WO2015/077983
PCT Pub. Date: Jun. 4, 2015

(65) Prior Publication Data
US 2016/0309219 A1   Oct. 20, 2016

(51) Int. Cl.
*H04N 21/436* (2011.01)
*H04L 12/28* (2006.01)
(Continued)

(52) U.S. Cl.
CPC ..... *H04N 21/43615* (2013.01); *H04L 12/283* (2013.01); *H04L 12/2807* (2013.01);
(Continued)

(58) Field of Classification Search
CPC .......... H04N 21/43615; H04L 12/2807; H04L 12/2816
See application file for complete search history.

(56) References Cited

U.S. PATENT DOCUMENTS 7,908,389 B2   3/2011   Zuckerman et al.
9,258,579 B1 *  2/2016   Reeves ............ H04N 21/23439
(Continued)

FOREIGN PATENT DOCUMENTS

CN   101686228 A   3/2010
CN   101854287 A   10/2010
(Continued)

OTHER PUBLICATIONS

Partial English Translation and Abstract of Chinese Patent Application No. CN101854287, Jun. 8, 2016, 8 pages.
(Continued)

*Primary Examiner* — Sumaiya A Chowdhury
(74) *Attorney, Agent, or Firm* — Conley Rose, P.C.

(57) ABSTRACT

A control device and a computer program product configured to complete the functions of determining that a task needs to be executed, where the task is a task to distribute the media content to a media play apparatus, acquiring device information of the multiple media distribution devices, selecting an available media distribution device from the multiple media distribution devices according to the device information, where the available media distribution device may be configured to process the media content such that the media content has an adaptive media stream format suitable for the media play device, and assigning, when there are multiple available media distribution devices, at least one segment of the media content to each of the available media distribution devices such that the multiple available media distribution devices jointly process the media content.

16 Claims, 7 Drawing Sheets

(51) Int. Cl.
*H04N 21/647* (2011.01)
*H04N 21/858* (2011.01)

(52) U.S. Cl.
CPC ... *H04L 12/2816* (2013.01); *H04N 21/64723* (2013.01); *H04N 21/8586* (2013.01); *H04L 2012/2849* (2013.01)

(56) References Cited

U.S. PATENT DOCUMENTS

| | | | | |
|---|---|---|---|---|
| 2006/0171684 | A1* | 8/2006 | Fukuda | G11B 27/034 386/235 |
| 2007/0028262 | A1* | 2/2007 | Bucher | H04H 60/27 725/34 |
| 2007/0162941 | A1* | 7/2007 | Bennett | H04N 5/4403 725/81 |
| 2008/0285936 | A1* | 11/2008 | Yampanis | H04N 7/17327 386/248 |
| 2010/0211636 | A1* | 8/2010 | Starkenburg | H04N 7/17318 709/203 |
| 2012/0284736 | A1* | 11/2012 | Friedman | H04H 20/22 725/14 |
| 2015/0195327 | A1* | 7/2015 | Bouazizi | H04L 65/4076 709/219 |
| 2016/0205164 | A1* | 7/2016 | Schmidt | H04L 1/0001 709/219 |
| 2017/0019445 | A1* | 1/2017 | Panje | H04L 65/601 |
| 2017/0078275 | A1* | 3/2017 | Slovetskiy | H04L 63/0807 |

FOREIGN PATENT DOCUMENTS

| | | |
|---|---|---|
| CN | 101938483 A | 1/2011 |
| CN | 102739779 A | 10/2012 |

OTHER PUBLICATIONS

Partial English Translation and Abstract of Chinese Patent Application No. CN102739779, Jun. 8, 2016, 5 pages.

"Series H: Audiovisual and Multimedia Systems, Infrastructure of audiovisual services—Coding of moving video, Advanced video coding for generic audiovisual services," ITU-T, H.264, Apr. 2013, 732 pages.

"Series H: Audiovisual and Multimedia Systems, Infrastructure of audiovisual services—Coding of moving video, High efficiency video coding" ITU-T, H.265, Apr. 2013, 317 pages.

Foreign Communication From A Counterpart Application, PCT Application No. PCT/CN2013/088162, English Translation of International Search Report dated Sep. 11, 2014, 2 pages.

Foreign Communication From A Counterpart Application, PCT Application No. PCT/CN2013/088162, English Translation of Written Opinion dated Sep. 11, 2014, 41 pages.

Foreign Communication From a Counterpart Application, Chinese Application No. 201380008315.4, Chinese Office Action dated May 12, 2017, 12 pages.

Foreign Communication From a Counterpart Application, Chinese Application No. 201380008315.4, Chinese Search Report dated May 3, 2017, 2 pages.

* cited by examiner

APPARATUS AND METHOD FOR MEDIA PLAY IN HOME NETWORK

CROSS-REFERENCE TO RELATED APPLICATION

This application is a U.S. National Stage of International Application No. PCT/CN2013/088162, filed on Nov. 29, 2013, which is hereby incorporated by reference in its entirety.

TECHNICAL FIELD

The present application mainly relates to a communications technology, and in particular, to an apparatus and method for media play in a home network.

BACKGROUND

With development of a digital home network, a consumer may form various smart devices, wireless devices, personal computers (PCs), and the like into a peer to peer (P2P) network using the universal plug and play (UPnP) protocol. Basic components of an UPnP network includes a control point (CP) and a device. In a P2P home network supporting UPnP, a user may invoke a control action related to an UPnP device using the CP to read status information of the UPnP device in the home network and control the UPnP device to perform a corresponding operation. For example, when a mobile phone or another mobile device is used to control a PC to watch television, the mobile phone or the other mobile device is the CP, and the PC is the device. In the UPnP network, a device may have both a function of the device and a function of the CP, that is, the device may serve as an UPnP device to provide a service, or may also serve as a CP to discover and control another device.

To implement media content sharing between various devices in a home, the UPnP forum establishes an audio and video (AV) standard. The Digital Living Network Alliance (DLNA) refers to the UPnP AV standard and defines related device types.

For an example, a digital media server (DMS) is configured to acquire, record, store, and output a media file. The DMS may further include another intelligent function, for example, device/user service management, rich user interfaces, and media management, collection, and distribution functions. An example of the DMS includes an advanced set-top box (STB), a home television theater with a hard disk, a multimedia mobile phone, and the like.

A digital media play device is configured to play a media resource from the DMS or a network side, and includes a digital media player (DMP) and a digital media renderer (DMR). The DMR or DMP may also be collectively referred to as an XDMR. An example of the DMP includes a television, a stereo and home television theater, a personal digital assistant, a multimedia mobile phone, a wireless display, a game console, and the like. An example of the DMR includes a television, an audio and video receiver, a video display, a wireless music speaker, and the like.

A digital media controller (DMC) is configured to search for a multimedia file on the DMS, instruct the XDMR to play a multimedia file, and control upload of a multimedia file to the DMS. An example of the DMC includes an intelligent remote control, and a multimedia mobile phone may also include a DMC function.

The foregoing devices specified in the DLNA may use a home network media content distribution technology such as dynamic adaptive streaming over hypertext transfer protocol (HTTP) (DASH) to implement media content sharing in the home network. For example, a DMS that has a DASH function may perform DASH processing on media content. DASH processing includes using the media content to generate multiple backups with different bit rates, cutting each backup into slices of 3 to 5 seconds even a shorter time interval, and generating a media presentation description (MPD) file for the media content. A bit rate may be 200 kilobits per second (Kbps), 400 Kbps, 2 megabits per second (Mbps), and the like. The MPD file includes information about each slice, for example, a time range, a uniform resource locator (URL), and a media property. The media property includes a video resolution, an adaptation bit rate, and the like. When playing media content, a play device always selects a slice with a currently highest bit rate, thereby preventing frame freezing and buffer. The currently highest bit rate refers to a highest bit rate supported by the home network. For specific content of DASH, refer to the international standard Moving Picture Experts Group (MPEG)-DASH.

It may be learned from the foregoing that, because multiple backups respectively corresponding to different bit rates need to be generated for each piece of media content, an existing sharing technology imposes a high requirement on a processing capability (for example, a processing speed and storage space) of a DASH device, which increases costs of a device. Higher picture quality or sound quality of media content imposes a higher requirement on a device, which causes higher device costs.

SUMMARY

To resolve a media content processing efficiency problem, an embodiment of the present disclosure provides a control device configured to control media content distribution in a home network, where the home network includes the control device, a media play device, and multiple media distribution devices, and the control device includes a network interface, a memory, and a processor, where the network interface is configured to communicate with the multimedia play device and the media distribution devices. The memory is configured to store a computer executable instruction, and the processor is configured to execute the computer executable instruction in order to complete the following steps: determining that a task needs to be executed, where the task is a task to distribute the media content to a media play apparatus, acquiring device information of the multiple media distribution devices, selecting an available media distribution device from the multiple media distribution devices according to the device information, where the available media distribution device may be configured to process the media content such that the media content has an adaptive media stream format suitable for the media play device, and assigning, if there are multiple available media distribution devices, at least one segment of the media content to each of the available media distribution devices such that the multiple available media distribution devices jointly process the media content.

An embodiment of the present disclosure further provides a computer program product configured to control media content distribution in a home network, where the home network includes a control device, a media play device, and multiple media distribution devices, the computer program product includes a non-volatile computer readable storage medium, the non-volatile computer readable storage medium is configured to store a computer executable instruction, and when a processor of the control device executes the computer executable instruction, the control device is configured to perform the following steps: determining that a task needs to be executed, where the task is a task to distribute the media content to a media play apparatus, acquiring device information of the multiple media distribution devices, selecting an available media distribution device from the multiple media distribution devices according to the device information, where the available media distribution device may be configured to process the media content such that the media content has an adaptive media stream format suitable for the media play device, and assigning, if there are multiple available media distribution devices, at least one segment of the media content to each of the available media distribution devices such that the multiple available media distribution devices jointly process the media content.

An embodiment of the present disclosure further provides a control device configured to control media content distribution in a home network, where the home network includes the control device, a media play device, and multiple media distribution devices, and the control device includes a network interface and a processing apparatus, where the processing apparatus is coupled to the network interface and configured to complete, using the network interface, a communication function of communicating with the media distribution devices, where the communication function includes determining that a task needs to be executed, where the task is a task to distribute the media content to a media play apparatus, acquiring device information of the multiple media distribution devices, selecting an available media distribution device from the multiple media distribution devices according to the device information, where the available media distribution device may be configured to process the media content such that the media content has an adaptive media stream format suitable for the media play device, and assigning, if there are multiple available media distribution devices, at least one segment of the media content to each of the available media distribution devices such that the multiple available media distribution devices jointly process the media content.

An embodiment of the present disclosure further provides a control device configured to control media content distribution in a home network, where the home network includes the control device, a media play device, and multiple media distribution devices, and the control device includes a task determining unit configured to determine that a task needs to be executed, where the task is a task to distribute the media content to a media play apparatus, a device information acquiring unit configured to acquire device information of the multiple media distribution devices, a device selection unit configured to select an available media distribution device from the multiple media distribution devices according to the device information, where the available media distribution device may be configured to process the media content such that the media content has an adaptive media stream format suitable for the media play device, and a task assigning unit configured to assign, if there are multiple available media distribution devices, at least one segment of the media content to each of the available media distribution devices such that the multiple available media distribution devices jointly process the media content.

It may be learned from the foregoing that, by assigning a task of processing media content to one or multiple more available media distribution devices for processing, the embodiments of the present disclosure can significantly improve media processing efficiency or home device utilization.

BRIEF DESCRIPTION OF DRAWINGS

To describe the technical solutions in the embodiments of the present disclosure or in the prior art more clearly, the following briefly introduces the accompanying drawings required for describing the embodiments.

DESCRIPTION OF EMBODIMENTS

Figure 1:
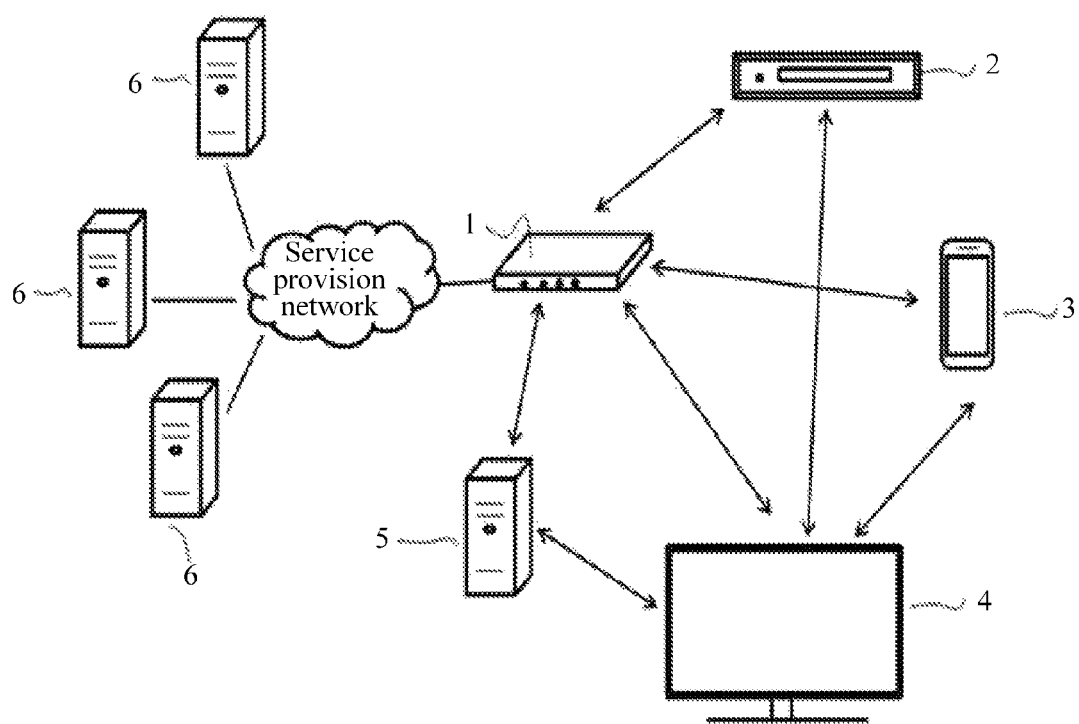
FIG. 1 is a schematic diagram of an architecture of a home network according to an embodiment of the present application.

The following clearly and completely describes the technical solutions in embodiments of the present disclosure with reference to the accompanying drawings in the embodiments of the present disclosure.

In the embodiments of the present disclosure, media devices that can form a home network include a home gateway, an STB, a high definition television (HDTV), a network attached storage (NAS) device, a smartphone, a tablet computer, a PC (including a desktop computer and a laptop computer), and the like. The media devices in the home network may be logically classified into a control device, a media content distribution device, and a media content play device. The media devices of the foregoing three types may respectively include the following functions.

(i) Control Device

The control device is configured to acquire device information of the media devices in the home network, select an available media distribution device according to the acquired device information, and assign media content or a segment of the media content that needs to be processed to each available media distribution device. The processing herein includes converting the media content or segment of the media content into a form suitable for distribution, for example, the DASH processing described above. A device that can perform DASH processing is referred to as a DASH device. The media distribution device may be a DASH device. The control device in the embodiments of the present disclosure may be a DMC in a DLNA.

The control device may further receive an index file from the media distribution device and send the index file to the media play device. The index file corresponds to processed media content/segment of the media content, and therefore the media play device may find the media content according to the index file, and play the media content. Optionally, the index file may be an MPD file.

The control device in the embodiments of the present disclosure may be a logical device. That is, the control device in the embodiments of the present disclosure may be an independent control server, or may be a software module embedded into a home device. For example, if corresponding software is embedded into a personal computer, a home gateway, and a smartphone, these devices may also serve as a control device.

(ii) Media Content Distribution Device

The media content distribution device is configured to convert the media content or segment of the media content distributed by the control device into a form suitable for distribution, and feeds back a corresponding index file to the control device. For example, the media content distribution device may perform DASH processing on the media content or segment of the media content and feed back a corresponding MPD file to the control device. A PC, a television, a smartphone, a NAS device, and the like in the home network may all serve as a media distribution device. The media content distribution device in the embodiments of the present disclosure may be a DMS in the DLNA.

(iii) Media Content Play Device

The media content play device is configured to play the processed media content or segment of the media content. A PC, a television, and a smartphone in the home network may all serve as a play device. The media content play device in the embodiments of the present disclosure may be an XDMR in the DLNA.

FIG. 1 is a schematic diagram of an architecture of a home network according to an embodiment of the present application. The home network may be a P2P network that uses the UPnP protocol. The home network shown in FIG. 1 includes a home gateway 1, an STB 2, a mobile phone 3, a HDTV 4, and a NAS device 5.

The home gateway 1 connects and controls all devices that can connect to the network inside a home, and is a network connection center and control center inside the home. In this embodiment of the present disclosure, the home gateway 1 may acquire device information of devices in the home network, and select an available device according to the device information. Then, the home gateway 1 assigns a DASH task to the available device. The DASH task herein refers to performing DASH processing on media content. In addition, the home gateway 1 may further receive an MPD file corresponding to the DASH task from the device selected by the home gateway 1, and send the MPD file to the HDTV 4.

The STB 2, the mobile phone 3, and the NAS device 5 may all serve as the media content distribution device described above, which is configured to acquire, record, store, and output a media file. If the home gateway 1 selects the STB 2 and the NAS device 5 to jointly process the DASH task, the home gateway 1 separately assigns a task to the STB 2 and the NAS device 5. After receiving the task assigned by the gateway, both the STB 2 and the NAS device 5 may download media content from an open Internet video service over the top (OTT) server and perform DASH processing on the downloaded media content. When processing the DASH task, the STB 2 and the NAS device 5 further need to report, to the home gateway 1, an MPD file respectively corresponding to their own task.

The HDTV 4 may serve as the media content play device described above, which is configured to receive the MPD file from the home gateway 1, and acquire, according to the MPD file, a media resource from the STB 2, the NAS device 5, and another device, and play the media resource.

Figure 2:
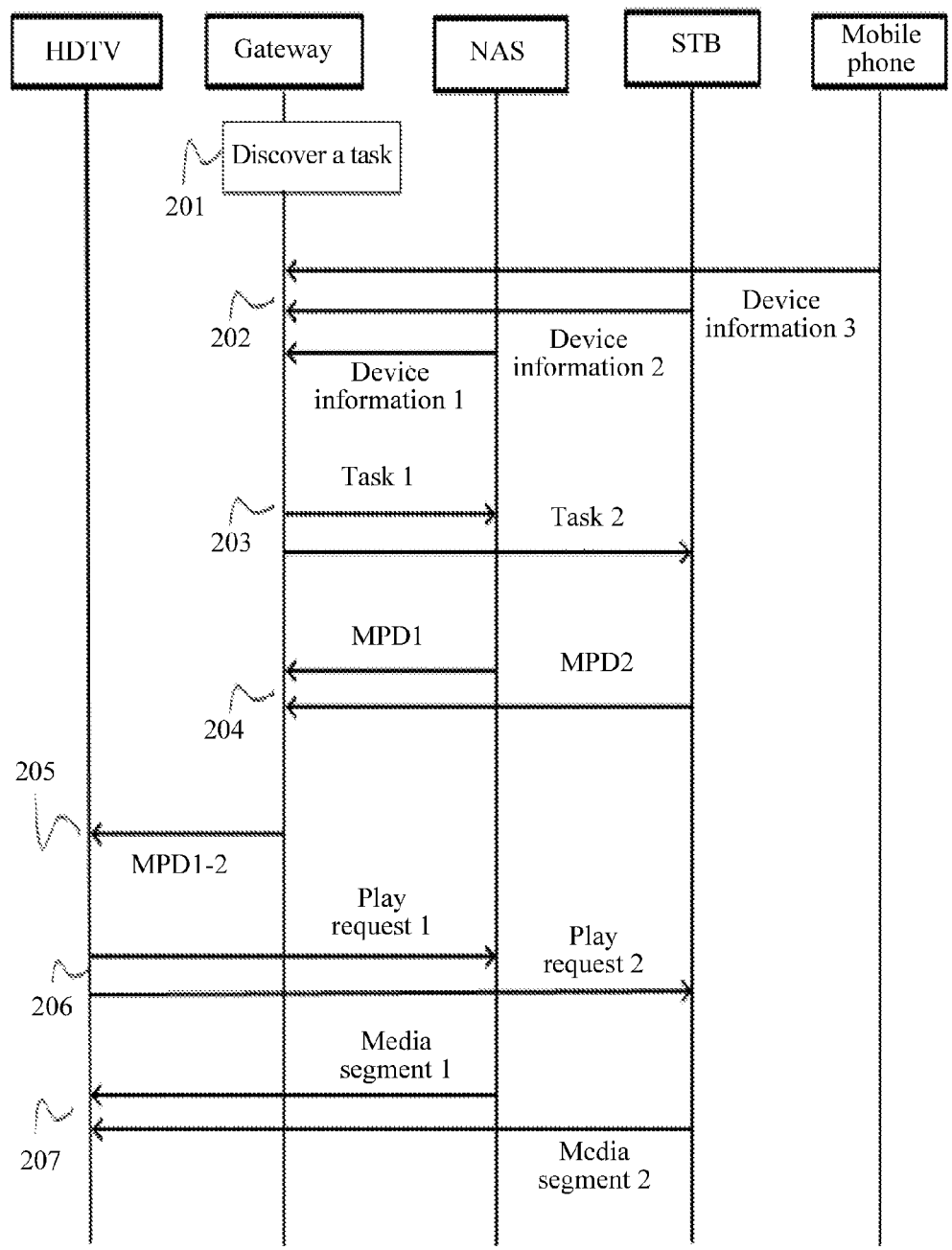
FIG. 2 is a schematic diagram of an information exchange between media devices in a home network.

FIG. 2 is a schematic diagram of an information exchange between the devices in FIG. 1. According to FIG. 2, a general process of playing media content by a media device in a home network is as follows.

Step 201: A control device finds that a task needs to be processed, that is, DASH processing needs to be performed on media content to be played by a user.

Step 202: A gateway acquires device information of an STB, a HDTV, and a NAS device.

Step 203: Select the NAS and the STB according to the acquired device information, and assigns a task to the NAS and the STB.

The STB, the HDTV, and the NAS device all have a DASH function. It should be noted that, that the gateway selects the NAS and the STB is merely an example. The gateway may also select any one or more of the STB, the HDTV, and the NAS device.

Step 204: After receiving the task assigned by the gateway, the NAS and the STB download media content from an open Internet video service OTT server and perform DASH processing on the downloaded media content. The NAS and the STB further upload or send, to the gateway, MPD files generated when DASH processing is performed.

Step 205: After receiving the MPD files from the NAS and the STB, the gateway sends these MPD files to the HDTV. The gateway may actively send the MPD files, or may send the MPD files according to a request of the HDTV.

Step 206: After acquiring the MPD files from the gateway, the HDTV may request, from the NAS and the STB, corresponding media segments according to the acquired MPD files.

Step 207: Acquire the corresponding media segments, and play the media segments.

The OTT server mentioned above is a platform used to provide a multimedia service for a user. The OTT server may transmit, using a streaming protocol, a video file to a client for watching online by a user. Alternatively, the OTT server may receive a real-time video stream from video collection and compression software, and then live broadcast the real-time video stream to the client using a streaming protocol. The streaming protocol includes the real-time transport protocol (RTP)/real time streaming protocol (RTSP), MICROSOFT media services (MMS), real time messaging protocol (RTMP), HTTP, and the like.

The foregoing simply describes a structure of a home network and a process of distributing media content in the home network in the embodiments of the present disclosure. It should be noted that, the media device in the embodiments of the present disclosure may be applicable to but not limited to the UPnP, DLNA, and DASH technology. For example, an HTTP Adaptive Streaming (HAS) technology similar to the DASH further includes the HTTP Live Streaming technology of APPLE COMPUTER, INC., the Smooth Streaming technology of MICROSOFT, the HTTP Dynamic Streaming technology of ADOBE SYSTEMS INCORPORATED, and the like. In addition, the media content in the embodiments of the present disclosure not only includes a video file, but also includes an audio file and another similar file. For ease of description, the following describes a control device, a DASH device, and a media play device one by one using an example in which a movie is played only using the DASH technology.

Figure 3:
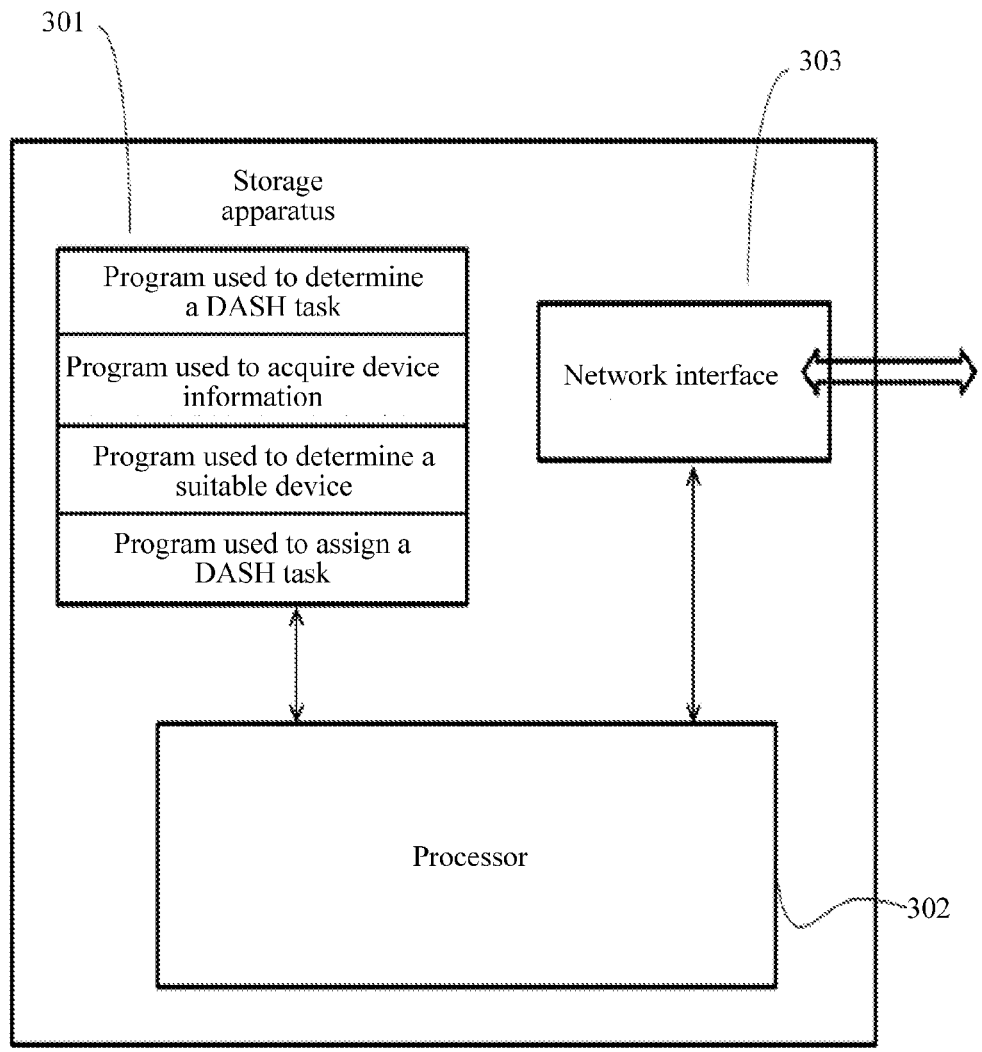
FIG. 3 is a schematic structural diagram of a control device according to an embodiment of the present disclosure.
Figure 4:
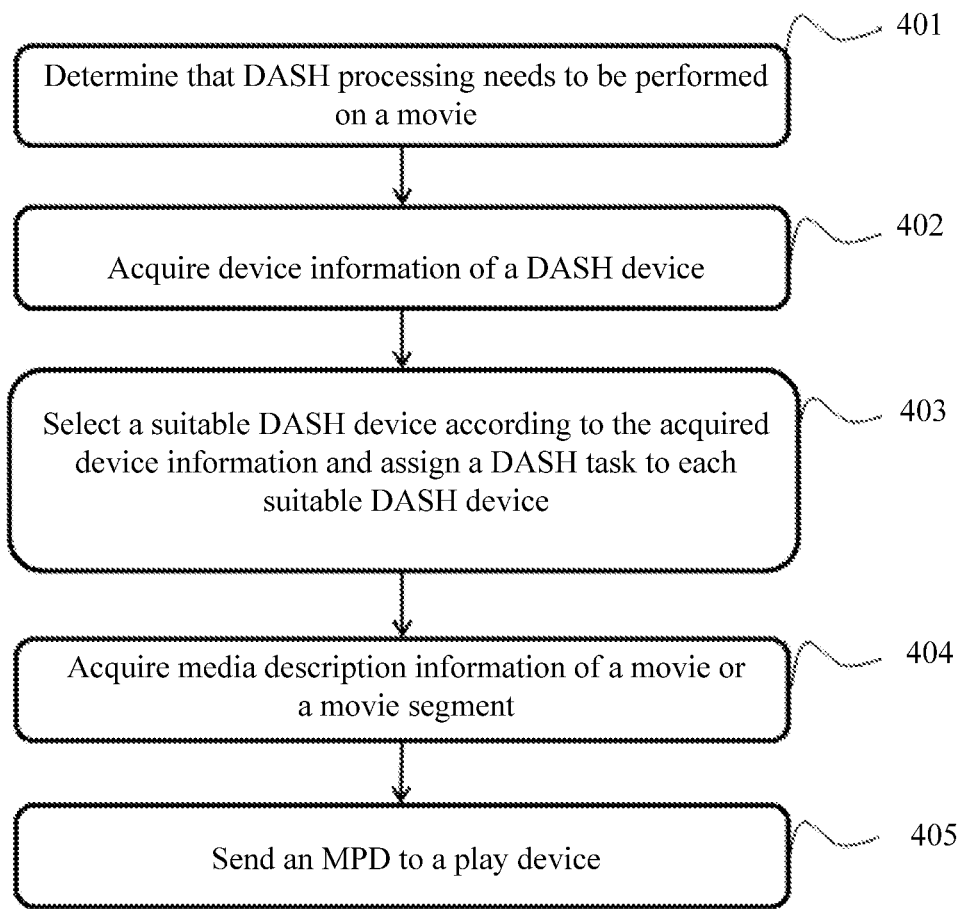
FIG. 4 is a flowchart of a method executed by a control device according to an embodiment of the present disclosure.

FIG. 3 is a schematic structural diagram of a control device according to an embodiment of the present disclosure. FIG. 4 is a flowchart of a method executed by a control device in a process of playing a movie.

According to FIG. 3, the control device in this embodiment of the present disclosure includes a storage apparatus 301, a processor 302, and a network interface 303. The storage apparatus 301 is configured to store a program or instruction required for implementing this embodiment of the present disclosure. The program or instruction may be installed in the control device by a control device manufacturer, or may be downloaded and installed by a user. The processor 302 is configured to read and execute the program or instruction in the storage apparatus 301, and communicate with another device using the network interface 303 in an execution process. Specific communication content is described with reference to a function of the processor. The network interface 303 includes a circuit, an interface, and the like required for communicating with a device in a network.

In FIG. 3, the processor 302 may be one integrated circuit or a set of multiple integrated circuits. The processor 302 mainly includes two components, an arithmetic unit and a controller. In addition, the processor 302 further includes components such as several registers and a cache, and a data, control, and status bus for implementing contact between the components. By performing operations such as fetch, decode, execute, and write back on the program or instruction, the processor 302 can implement various functions.

Furthermore, when the processor 302 executes the instruction in the storage apparatus 301, the processor 302 is configured to perform, using the network interface 303, method shown in FIG. 4. The method may include the following steps.

Step 401: The processor determines that DASH processing needs to be performed on a movie. When determining that a movie needs to be downloaded, the processor may immediately determine that DASH processing needs to be performed on a movie. In this case, a process of determining that a movie needs to be downloaded is actually a process of determining that DASH processing needs to performed on a movie. When determining that a movie needs to be downloaded and a preset condition is met, the processor may also determine that DASH processing needs to be performed on a movie. For example, the preset condition may be that a preview time of a user reaches a threshold value, or may be that an instruction of continuing downloading is received from a user. The preview time of a user refers to a time in which a user previews a movie downloaded by a DASH device. The preset threshold value may be manually set by a user, or may be automatically set by the control device according to media play fluency, network bandwidth, or another condition.

As described above, in addition to being applicable to the DASH technology, this embodiment of the present disclosure may further be applicable to another HAS technology. Therefore, the foregoing step 401 is only an example of the step "determining that a task needs to be executed" in this embodiment of the present disclosure. The task in this embodiment of the present disclosure refers to distributing media content to a media play apparatus. Correspondingly, in subsequent steps, that a media distribution device performs DASH processing on media content or a segment of the media content assigned by the control device to the media distribution device is also an example in this embodiment of the present disclosure. The media distribution device may also process the media content or the segment of the media content using another HAS technology such that the media content or the segment of the media content has an adaptive media stream format suitable for the media play device.

Step 402: The processor acquires device information of a DASH device.

Step 401 may also be referred to as a step of discovering a DASH task. To complete the DASH task, the processor needs to acquire the device information of the DASH device. The DASH device refers to a device that has a DASH function. A home device such as a PC, a smartphone, a tablet computer, and a high definition television may be set to have the DASH function and be able to record its own device information. The device information of the DASH device includes a device type, a device status, a device capability, a use frequency of a user, a device priority, a device address, and the like. The processor may acquire one or more of these pieces of information. The status includes whether the DASH device is online, whether the DASH device is in a sleep state, or another status.

Step 403: The control device selects an available DASH device according to the acquired device information and assigns a DASH task to each available DASH device. The available DASH device is a DASH device that can subsequently perform DASH processing on the movie or a movie segment. The DASH task is a range or length of a movie segment that needs to be processed by the DASH device, instead of sending the movie segment or another segment of the media content to the DASH device or another media distribution device.

When assigning a DASH task, the processor may assign the task at one time, or may assign the task for multiple times. Sometimes, the user does not need to continuously watch a whole movie, and therefore it is unnecessary to perform processing on the whole movie at one time. The following is an example of assigning the task for multiple times. If there are two available DASH devices, a DASH device 1 and a DASH device 2, the processor may perform the following steps.

Step 1: Divide a movie into a segment 1 and a segment 2 according to a time sequence or a bit sequence.

Step 2: Assign the segment 1 to the DASH device 1 and the DASH device 2. Furthermore, the processor may divide the segment 1 into a sub-segment 11 and a sub-segment 12 and respectively assign the sub-segment 11 and the sub-segment 12 to the DASH device 1 and the DASH device 2.

Step 3: When processing on the sub-segment 11 and the sub-segment 12 are completed or to be completed, the segment 2 is assigned to the DASH device 1 and device 2. Furthermore, the processor may divide the segment 2 into a sub-segment 21 and a sub-segment 22 and respectively, and assign the sub-segment 21 and the sub-segment 22 to the DASH device 1 and the DASH device 2. It may be learned that, for a manner of assigning the task for multiple times, subsequent task assignment is continued only when a task assigned first has been or is to be completed. Therefore, the manner of assigning the task for multiple times may reduce a device resource. Certainly, if the movie is downloaded and DASH processing is performed but does not need to be played, the task may not need to be assigned for multiple times, or when the task is assigned for multiple times, it is not required to determine whether to continue assigning a subsequent media segment according to a play time of the user.

The task assigned by the control device may be the whole movie or also be a part that has not been previewed in the movie. According to step 401, the user may have previewed the movie before the control device assigns the task. Therefore, the control device may assign only a part that has not been previewed in order to reduce a resource. For example, if a total length of a movie is 90 minutes and a user has previewed content of the first 10 minutes of the movie, the control device assigns content of the remaining 80 minutes to multiple DASH devices. If the user previews key content or highlights of the movie, the control device may also assign the whole movie to the multiple DASH devices.

It should be noted that, in step 403, when assigning the task to multiple available DASH devices or multiple other media distribution devices, each available media distribution device is assigned with at least one media segment. The media segment assigned to each available media distribution device does not overlap or overlaps only a little with a media segment assigned to the multiple other available media distribution devices. That is, in this embodiment of the present disclosure, the multiple available media distribution devices jointly process the media content, and in this way, the user can watch the movie continuously played.

Step 404: The processor acquires media description information of the movie or the movie segment from the DASH device. In the foregoing step 403, the control device assigns the DASH task to the DASH device. In step 404, after receiving the DASH task, each DASH device acquires, according to task information, a corresponding movie or movie segment from a device that stores the movie, performs DASH processing on the acquired movie or movie segment, and sends an MPD of the corresponding movie or movie segment to the control device. The device that stores the movie may be a remote OTT server, or may be the control device or the DASH device.

The control device may acquire the MPD from the DASH device in multiple manners. For example, the control device may actively send a message or a command to the DASH device, and receive an MPD file returned by the DASH device according to the message or the command. Alternatively, the control device may receive an MPD file sent periodically by the DASH device. The control device may further acquire the MPD from the DASH device using a content directory service (CDS) in the DASH device. Furthermore, the control device may invoke a Content Directory::Browse( ) or Content Directory::Search( ) command in the CDS.

After receiving the MPD from each DASH device, the control device may further integrate these MPD according to a time sequence. The control device may not receive the MPD according to a play sequence of the media content. For example, the DASH device 1 and the DASH device 2 respectively process a former part and a latter part of the movie. If a processing speed of the DASH device 1 is slower than a processing speed of the DASH device 2, the control device may receive an MPD of the latter part of the movie before receiving an MPD of the former part of the movie. Furthermore, the control device may integrate multiple MPDs into one MPD file in a time sequence according to a movie name or movie category.

Content of the MPD includes media description information such as an address uniform resource identifier (URI), encoding format, and bit rate of a media segment. Optionally, an MPD file format is as follows:

```
<?xml version="1.0"?>
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011 DASH-MPD.xsd"
type="static"
mediaPresentationDuration="PT3256S"
minBufferTime="PT1.2S"
profiles="urn:mpeg:dash:profile:isoff-on-demand:2011">
<BaseURL>http://cdn1.example.com/</BaseURL>
<BaseURL>http://cdn2.example.com/</BaseURL>
<Period>
<!-- English Audio -->
<AdaptationSet mimeType="audio/mp4" codecs="mp4a.0x40" lang="en" subsegmentAlignment="true" subsegmentStartsWithSAP="1">
<ContentProtection schemeIdUri="urn:uuid:706D6953-656C-5244-4D48-656164657221"/>
<Representation id="1" bandwidth="64000">
<BaseURL>7657412348.mp4</BaseURL>
</Representation>
<Representation id="2" bandwidth="32000">
<BaseURL>3463646346.mp4</BaseURL>
</Representation>
</AdaptationSet>
<!-- French Audio -->
<AdaptationSet mimeType="audio/mp4" codecs="mp4a.40.2" lang="fr" subsegmentAlignment="true" subsegmentStartsWithSAP="1">
<ContentProtection schemeIdUri="urn:uuid:706D6953-656C-5244-4D48-656164657221"/>
<Role schemeIdUri="urn:mpeg:dash:role" value="dub"/>
<Representation id="3" bandwidth="64000">
<BaseURL>3463275477.mp4</BaseURL>
</Representation>
<Representation id="4" bandwidth="32000">
<BaseURL>5685763463.mp4</BaseURL>
</Representation>
</AdaptationSet>
<!-- Timed text -->
<AdaptationSet mimeType="application/ttml+xml" lang="de">
<Role schemeIdUri="urn:mpeg:dash:role" value="subtitle"/>
<Representation id="5" bandwidth="256">
<BaseURL>796735657.xml</BaseURL>
```

```
        </Representation>
      </AdaptationSet>
      <!-- Video -->
      <AdaptationSet    mimeType="video/mp4"    codecs="avc1.4d0228"
subsegmentAlignment="true" subsegmentStartsWithSAP="2">
        <ContentProtection
schemeIdUri="urn:uuid:706D6953-656C-5244-4D48-656164657221"/>
        <Representation id="6" bandwidth="256000" width="320" height="240">
        <BaseURL>8563456473.mp4</BaseURL>
        </Representation>
        <Representation id="7" bandwidth="512000" width="320" height="240">
        <BaseURL>56363634.mp4</BaseURL>
        </Representation>
        <Representation id="8" bandwidth="1024000" width="640" height="480">
        <BaseURL>562465736.mp4</BaseURL>
        </Representation>
        <Representation id="9" bandwidth="1384000" width="640" height="480">
        <BaseURL>41325645.mp4</BaseURL>
        </Representation>
        <Representation id="A" bandwidth="1536000" width="1280" height="720">
        <BaseURL>89045625.mp4</BaseURL>
        </Representation>
        <Representation id="B" bandwidth="2048000" width="1280" height="720">
        <BaseURL>23536745734.mp4</BaseURL>
        </Representation>
      </AdaptationSet>
    </Period>
  </MPD>
```

Step 405: The processor sends the MPD to the play device. After receiving the MPD sent by the DASH device, the processor sends the received MPD to the play device. After receiving the MPD, the play device may acquire, from a DASH device specified in the MPD, a movie segment corresponding to a highest bit rate that the home network can support, and play the movie segment.

When there are multiple play devices in the home network, the control device may determine, in multiple manners, to which play device the MDP is to be sent. The control device may determine, according to an operation of the user, to which play device the MPD is sent. Alternatively, the control device may determine, according to a request received from the play device, to which play device the MPD is sent.

Optionally, the control device may send an integrated MPD to the play device, or may send an MPD that is not integrated to the play device.

It may be learned from the foregoing steps 401 to 405 that, by specifying a movie to one or multiple more appropriate DASH devices for processing, the control device in this embodiment of the present disclosure may significantly improve media processing efficiency or home device utilization.

The foregoing simply describes a method executed by the control device. The following further describes content related to the steps 401 to 405. It should be noted that, not all parts of the following content are necessary for this embodiment of the present disclosure. A person skilled in the art may freely select any content or any content combination below according to a requirement, or use another implementation manner under inspiration of the following content.

In step 401, the control device may determine, using multiple methods, that a movie needs to be downloaded.

When the user sends, to the media play device, a command of playing a movie, the control device may determine, according to the play command, that a movie needs to be downloaded. The processor of the control device may send the play command to the play device using the network communications unit and determine that a movie needs to be downloaded.

When the user plays the movie by operating the play device, the play device may send a download command (referred to as an original DASH instruction below) to one DASH device (referred to as an original DASH device below) that is specified by the user or is automatically determined by the play device. The original DASH device may download the movie from a media storage device according to the download command and perform DASH processing. In this case, the processor of the control device may determine whether the DASH device is downloading the movie in at least the following two manners.

Manner 1: The processor may receive and analyze a message actively reported by the original DASH device when downloading the movie. The original DASH device may report the message to the control device when downloading the movie. The message carries information used to indicate that the DASH device is downloading or is to download the movie. The processor of the control device may determine, by analyzing the massage reported by the original DASH device, that a movie needs to be downloaded. For example, if a smartphone serves as the control device, the smartphone may receive the message reported by the DASH device.

Manner 2: The processor may analyze a data packet obtained from the original DASH device. The control device may listen to a port, in the DASH device, for downloading data and acquires a data packet transmitted using the port. The processor may analyze the data packet. Optionally, if the data packet includes metadata of the movie, the processor may determine that the DASH device is downloading the movie.

Metadata is explanation data, which is mainly used to describe data property information. The metadata of the movie may include any combination of various information such as an address, a media format, a time length, resolution, a size, and a distributor of the movie. A form of the address may be a URI. The metadata may be included in a header file of the data packet. When downloading the movie from the media storage device, the original DASH device first receives the header file including the metadata, and then receives content of the movie. Therefore, when the original DASH device starts downloading, the processor of the control device can determine, by analyzing the header file, whether a movie needs to be downloaded. If a gateway serves as the control device, the gateway may perform determining in a manner of listening to another home device. If the control device is the DASH device at the same time, for example, a PC, the PC can listen to its own port.

In step 401, the processor may determine a preview time of the user in multiple manners. The processor may determine the preview time of the user by listening to a download time of the DASH device. Alternatively, the processor may determine the preview time of the user according to the message reported by the play device.

A movie segment previewed by the user may be a continuous segment starting from a start point of the movie (for example, content of the first 10 minutes or content of bits from 0 to 50922393), or may be a key or highlight part of the movie. The processor of the control device may determine key content according to a media key information frame in the metadata. Then, the processor of the control device may instruct the play device to download and play the key content such that the user can preview the key content.

Optionally, after determining that DASH processing needs to be performed on the movie, the control device may further sends a stop command to the original DASH device to request the original DASH device to stop executing the original DASH instruction.

The home device may automatically download a movie in advance from the OTT server and store the movie when the home device is idle. The home device may download a whole movie, or may download only a movie segment for preview by the user. The home device provides the downloaded movie segment for the user to preview and when the preview time of the user reaches a preset threshold value, the home device downloads a remaining part of the movie.

A type of the movie or the movie segment downloaded by the home device in advance may be specified by the user or may be determined by the processor of the control device according to a user habit or related information of the movie. The home device may determine, according to media assessment and a release time provided on the OTT server, a use habit of the user, or another media content discovery mechanism, a movie or movie segment to be downloaded. For example, if the processor of the control device obtains, by analyzing metadata of a movie that a user has browsed, downloaded, or played, a user habit that the user likes watching a comedy, the processor of the control device automatically searches for a latest comedy on the network side and downloads the first 10 minutes of the comedy.

In step 402, the control device may acquire the device information of the DASH device in the home network in the following manner. The control device serves as a CP in a UPnP home network and discovers the DASH device in the home network using the simple service discovery protocol (SSDP). Then, the control device may acquire the device information of the DASH device using an "HTTP GET" message according to device description information of the discovered DASH device. Device description may be information such as a URL.

A record format of the device description information may be extensible markup language (XML) information, for example:

```
<?xml version="1.0"?>
<root xmlns="urn:schemas-upnp-org:device-1-0"
configId="configuration number">
<specVersion>
<major>1</major>
<minor>1</minor>
</specVersion>
<device>
<deviceType>urn:schemas-upnp-org:device:MediaRenderer:1</deviceType>
<friendlyName>HDTV</friendlyName>
<manufacturer>Huawei</manufacturer>
<manufacturerURI>http://www.huawei.com</manufacturerURI>
<modelDescription>long user-friendly title</modelDescription>
<modelName>model name</modelName>
<modelNumber>model number</modelNumber>
<modelURI>URI to model site</modelURI>
<serialNumber>0123456789</serialNumber>
<status>
<frequency>5</ frequency>
<priority>5</ priority >
</status>
<UDN>uuid:UUID</UDN>
<UPC>Universal Product Code</UPC>
......
<serviceList>
<service>
<serviceType>urn:schemas-upnp-org:service:ConnectionManager:1</serviceType>
<serviceId>urn:upnp-org:serviceId:ConnectionManager</serviceId>
<SCPDURI>ConnectionManager.xml</SCPDURI>
<eventSubURI>ConnectionManager/Event</eventSubURI>
<controlURI>ConnectionManager/Control</controlURI>
</service>
<service>
<serviceType>urn:schemas-upnp-org:service:AVTransport:1</serviceType>
<serviceId>urn:upnp-org:serviceId:AVTransport</serviceId>
<SCPDURI>AVTransport.xml</SCPDURI>
<eventSubURI>AVTransport/Event</eventSubURI>
<controlURI>AVTransport/Control</controlURI>
</service>
<service>
<serviceType>urn:schemas-upnp-org:service:RenderingControl:1</serviceType>
<serviceId>urn:upnp-org:serviceId:RenderingControl</serviceId>
<SCPDURI>RenderingControl.xml</SCPDURI>
<eventSubURI>RenderingControl/Event</eventSubURI>
<controlURI>RenderingControl/Control</controlURI>
</service>
</serviceList>
</device>
</root>
```

In step 403, an available DASH device may be a DASH device in a working state, a DASH device in a working state and with a lower priority, or a DASH device in a working state and with a lower use frequency of a user. Being in a working state includes a case in which a DASH device has been in a working state when the control device acquires the device information, and also includes a case in which a DASH device is in a working state after being woken up by the control device when the control device acquires the device information. The control device may wake up the DASH device in a UPnP wake-up manner or another wake-up manner.

In step 403, the DASH task may be indicated in multiple manners. One manner is indicated using time, for example, 0 to 30 minutes, another manner is indicated using a bit, for example, 0 to 50922393 bits. Metadata of a movie includes information such as a movie length, and therefore the control device may learn, by analyzing the metadata of the movie, a length of the movie that needs to be processed, and assign a corresponding DASH task to each available DASH device according to the movie length. It should be noted that, that the control device assigns the DASH task does not refer to sending a movie segment on which DASH processing needs to be performed to the DASH device.

In step 403, there may be only one or more available DASH devices obtained by the control device by determining.

If there is only one available DASH device obtained by determining, the control device assigns the whole to-be-processed movie to this DASH device. The control device may assign a task to the DASH device in a manner of a message, a command, or an event. Optionally, the control device may send the URI of the movie to this DASH device such that the DASH device may download, according to the received URI, the movie and perform DASH processing. An advantage is that the media content may be handed to a more available DASH device, for example, a device of a higher capability or an idle device, for processing. This improving media processing efficiency or home device utilization.

If there are multiple available DASH devices (that is, at least two) obtained by determining, the control device assigns the DASH task to each of the available DASH devices. In this way, these available devices can jointly complete DASH processing on the movie, thereby improving processing efficiency and device utilization. The processor may assign the DASH task to multiple available DASH devices in the following manners.

The processor may equally assign the DASH task. For example, if a length of a to-be-processed movie is 90 minutes and there are three available DASH devices, the processor may equally divide the movie into a segment 1, a segment 2, and a segment 3 that have a same length. The segment 1, the segment 2, and the segment 3 are respectively corresponding to three time intervals, 0 to 30 minutes, 31 to 60 minutes, and 61 to 90 minutes. Then, the processor instructs the three DASH devices to respectively process a segment. For example, a first DASH device processes the segment 1, a second DASH device processes the segment 2, and a third DASH device processes the segment 3.

The processor may determine another suitable assignment manner after comprehensively considering various types of device information. For example, the processor may assign less tasks to or not assign a task to a device with a high use frequency of a user and/or a high priority. A device with a high use frequency of a user and/or a high priority generally processes another task. If a DASH task is assigned to these devices, these devices cannot complete the DASH task in time or quickly because of excessive tasks. Conversely, if the processor assigns more tasks to a device with a low use frequency of a user and/or a low priority, the processor may fully use these devices, thereby improving a DASH processing speed. Similarly, if the processor assigns more tasks to a device with a higher processing capability, the DASH processing speed may also be improved.

If there are multiple available DASH devices obtained by determining, the processor may send an instruction to each of the suitable DASH devices using a message, a command, or an event. Each instruction includes address information of a DASH device and a DASH task of the DASH device. Optionally, the DASH task may be indicated using a URI fragment of a movie segment. The URI fragment includes a storage address of the movie segment and a length (a time length or a bit length) of the movie segment. When assigning a DASH task, the processor may generate multiple URI fragments according to a URI and movie length included in the metadata of the movie. If there are two available DASH devices, the URI of the movie is http://10.11.85.185:9500/xxx/huawei/avatar.mp4, and a size of the movie is 15632663 bits, the control device generates two URI fragments, and respectively assigns the two URI fragments to the corresponding DASH devices. For example, the two URI fragments may respectively be as follows:

URI fragment 1:
GET /xxx/huawei/avatar.mp4 HTTP/1.1
Host: 10.11.85.185:9500
User-Agent: HuaweiMedia/1.0.0.9A406a (Huawei.TV; U; CPU OS 5_0_1 like Android; zh_cn)
Accept: */*
Range: bytes=0-50922393
Accept-Encoding: identity
X-Play-Session-Id: 93551C62-60F8-40ED-9100-98678D2943F7
Connection: keep-alive
URI fragment 2:
GET /xxx/huawei/avatar.mp4 HTTP/1.1
Host: 10.11.85.185:9500
User-Agent: HuaweiMedia/1.0.0.9A406a (Huawei.TV; U; CPU OS 5_0_1 like Android; zh_cn)
Accept: */*
Range: bytes=50922394-15632663
Accept-Encoding: identity
X-Play-Session-Id: 93551C62-60F8-40ED-9100-98678D2943F7
Connection: keep-alive In the foregoing URI fragment, a Host field indicates a storage address of the movie segment, and a Range field indicates a range of the movie segment that needs to be processed by the DASH device. A segment processed by the first DASH device is 0 to 50922393 bits, and a segment processed by the second DASH device is 50922393 to 15632663 bits.

It should be noted that a specific format and usage of a URI and a URI fragment are not uniformly specified, which may be defined by each manufacturer itself. For example, the Range field described above may also indicate, using a time length, a segment of media content that needs to be processed by the DASH device, for example, 0 to 1800 seconds.

Optionally, if the original DASH device mentioned above is also an available DASH device determined by the control device according to the device information, the original device may learn, after receiving the DASH task assigned by the control device, that the original DASH instruction does not need to be executed. Therefore, the original device may determine, according to the DASH task received from the control device, to quit executing the original instruction and perform the DASH task assigned by the control device.

A person skilled in the art may understand that a function implemented in a manner in which the processor executes a program or an instruction may also be implemented using hardware. For example, using technologies such as a field-programmable gate array (FPGA) and application-specific integrated circuit (ASIC), a person skilled in the art may design a corresponding hardware circuit under inspiration of the foregoing content. A person skilled in the art may select a hardware implementation manner or a software implementation manner according to a factor such as costs or performance balance. In this embodiment, both a processor that executes a program/code and another hardware circuit that can implement a same or similar function can be referred to as a processing apparatus. A structure and principle of the foregoing processing apparatus are also applicable to another embodiment of the present disclosure, and details are not described again subsequently.

The foregoing describes a basic structure and functions of a control device in an embodiment using an example of a DASH technology. A person skilled in the art may understand that various home devices may serve as a control device in this embodiment. For example, the control device may be a home gateway, a mobile phone, or an STB. In addition, if the control device itself also has a DASH function, the control device may also serve as the DASH device described above. That is, a physical device may have both a control function and a DASH function. Correspondingly, if a control device is also a DASH device, in the foregoing related steps, the device information acquired by the control device includes the device information of the control device itself. When the control device is selected as a unique available DASH device or one of multiple available DASH devices, the control device assigns all or a part of tasks to the control device itself and processes the corresponding tasks.

Figure 5:
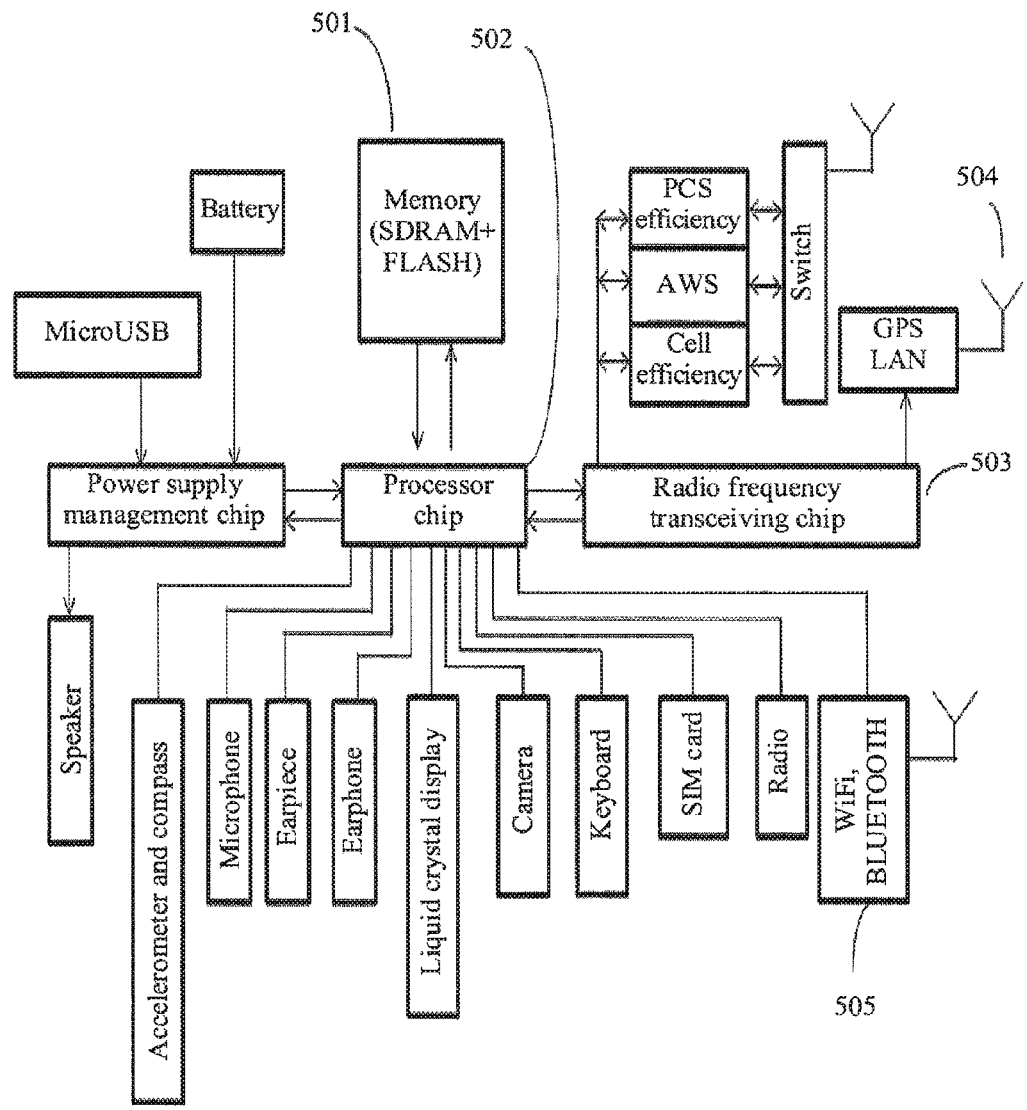
FIG. 5 is a schematic structural diagram of a mobile phone according to an embodiment of the present disclosure.

As described above, in some application scenarios, a mobile phone may serve as the control device in this embodiment of the present disclosure. FIG. 5 is a schematic structural diagram of a mobile phone that can serve as a control device according to an embodiment of the present disclosure. According to FIG. 5, the mobile phone in this embodiment of the present disclosure mainly includes a memory 501, a processor chip 502, a radio frequency transceiving chip 503, an antenna 504, and a WIFI/BLUETOOTH module (including an antenna) 505.

The memory 501 is configured to store a program or instruction required for implementing this embodiment of the present disclosure. These programs or instructions may be installed in the memory 501 by a manufacturer of the mobile phone, or may be downloaded and installed by a user of the mobile phone. The memory 501 may be a built-in storage of the mobile phone or may be an external expansion storage device such as a mobile hard disk, a floppy disk, an optical disc, a universal serial bus (USB) flash drive, or an secure digital (SD) card.

The processor chip 502 is a control center of the mobile phone, which connects all parts of the entire mobile phone using various interfaces and lines, and enables all parts of the mobile phone to work coordinately under operating control of software. In this embodiment of the present disclosure, the processor chip 502 is configured to read and execute a program or instruction in the processor chip 502 in order to complete the foregoing steps 401 to 405. In addition, the processor chip 502 communicates with another device using a network communications unit in an execution process.

The radio frequency transceiving chip 503 and the antenna 504 are configured to establish communication between the mobile phone and another device, implement data receiving and sending between the mobile phone and another device for communication between the mobile phone and another device. Furthermore, in a process of performing steps 401 to 405, the processor chip 502 communicates with the DASH device and the play device using the radio frequency transceiving chip 503 and the antenna 504. Certainly, the foregoing function of the radio frequency transceiving chip 503 and antenna 504 may also be completed using the WIFI/BLUETOOTH module (including an antenna) 505 or another similar structure.

Optionally, the mobile phone in this embodiment of the present disclosure may further include a display screen, a power supply, and an audio circuit in order to complete a basic function of the mobile phone. The foregoing display screen may be a touchscreen. The foregoing audio circuit includes a microphone and a speaker. The microphone is used to collect sound and convert the collected sound into sound data such that the mobile phone sends the sound data to a wireless network using a radio frequency circuit. The speaker is used to restore, into sound, the sound data that the mobile phone receives from the radio network using the radio frequency circuit, and play the sound to a user.

Figure 6:
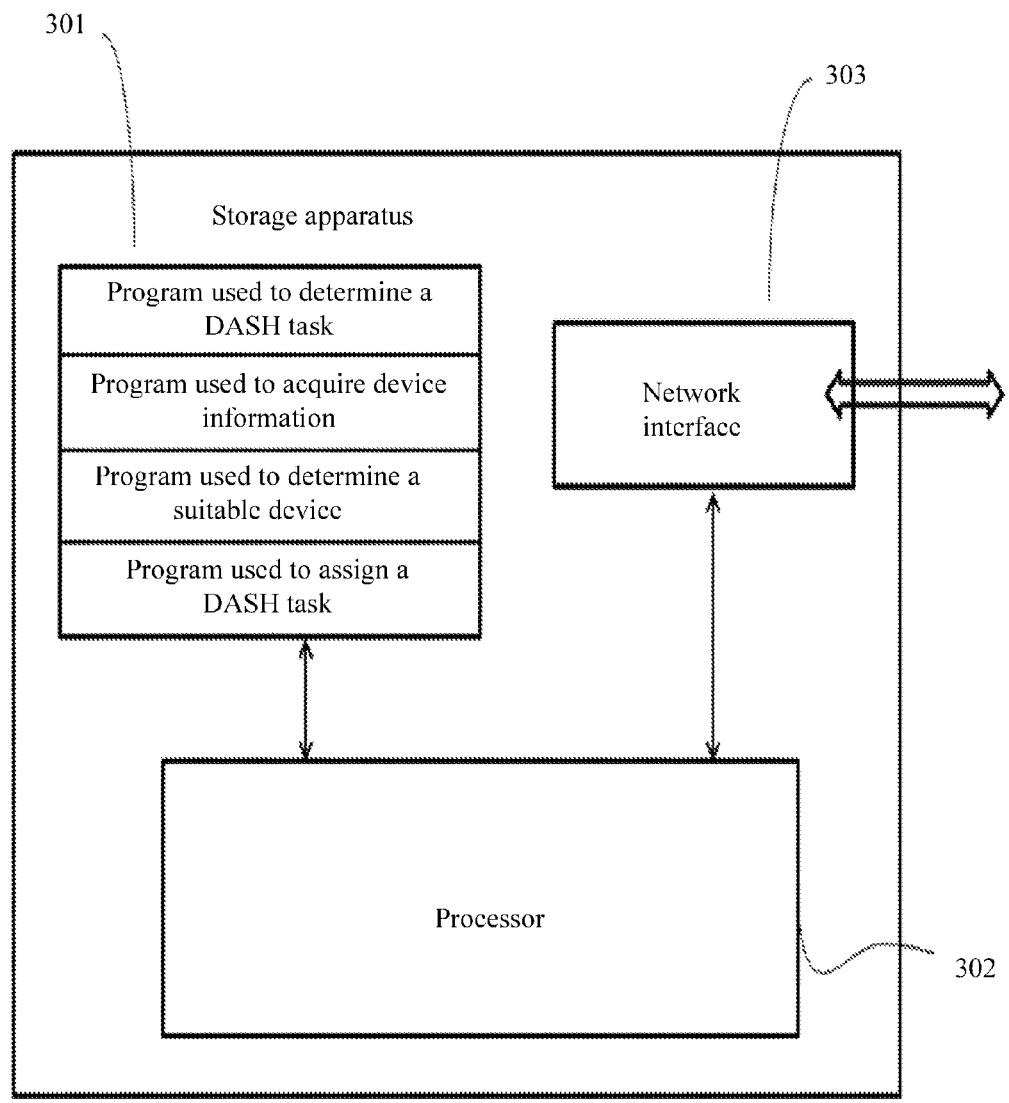
FIG. 6 is a schematic structural diagram of a media content distribution device according to an embodiment of the present disclosure.
Figure 7:
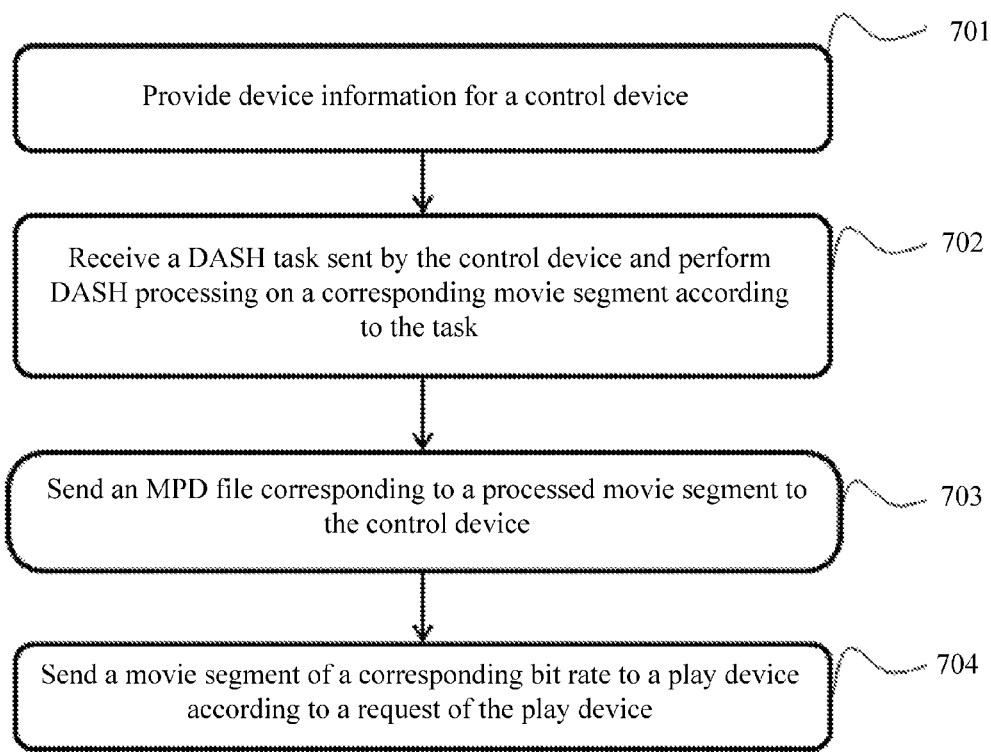
FIG. 7 is a flowchart of a method executed by a media content distribution device according to an embodiment of the present disclosure.

FIG. 6 is a schematic structural diagram of a DASH device according to an embodiment of the present disclosure. FIG. 7 is a flowchart of a method executed by a DASH device in a movie playing process. The DASH device in this embodiment of the present disclosure may include a storage apparatus 301, a processor 302, and a network interface 303. The storage apparatus 301 is configured to store an instruction required for implementing this embodiment of the present disclosure, and the instruction may be provided by a device manufacturer or may be downloaded and installed by a user. The processor 302 is configured to read and execute the instruction in the storage apparatus 301, including performing data and/or information processing, and communicating with a control device, a play device and/or a remote server using the network interface 303. The network interface 303 includes a circuit, an interface, and the like required for communicating with a device in a network.

Furthermore, according to FIG. 7, when the processor 302 executes the instruction in the storage apparatus 301, a home media control device is configured to complete the following steps using the network interface 303.

Step 701: The processor provides device information for the control device. As described in the foregoing steps 401 to 405, the DASH device may record its own device information. The control device may request a device description URI of the DASH device from the DASH device using the SSDP. Correspondingly, after receiving the request of the control device, the DASH device feeds back its own device information to the control device. For example, the control device may send a message "ssdp:discover" to an SSDP port of a specific multicast address using an "M-SEARCH" method. When the DASH device detects the message sent by a control point at the reserved multicast address, the DASH device directly responds to the request of the control point in a unicast manner.

Step 702: The processor receives a DASH task sent by the control device and performs DASH processing according to the task. A manner in which the DASH device receives the DASH task includes receiving an instruction sent by the control device in a manner of a message, a command or an event. The instruction includes address information of the DASH device and a URI fragment of a movie segment that needs to be processed by the DASH device. The URI fragment includes an address of the movie segment and a range of the movie segment. The URI fragment is generated by the control device according to information such as a URI and a movie length that are included in metadata of the movie. A generating method, a structure, and the like of the URI fragment are described as steps 401 to 405, and details are not described herein again.

After receiving the task assigned by the control device, the DASH device downloads, from the remote server or a home device, a movie segment (for example, 0 to 50922393 bits) indicated in the instruction, performs DASH processing on the movie segment, and generates a corresponding MPD file for a processed movie segment.

Optionally the DASH device may further determine, after receiving the DASH task assigned by the control device, that executing the original instruction is not required, thereby quitting executing the original instruction and turning to executing the DASH task assigned by the control device, if the DASH device that receives the DASH task is also the foregoing original DASH device.

Step 703: The processor provides an MPD of the movie segment to the control device. The DASH device may provide the MPD of the movie segment for the control device in multiple manners. For example, the DASH device may return the MPD file to the control device after receiving a message or command actively sent by the control device, or may periodically send the MPD file to the control device.

Step 704: The processor sends the movie segment to the play device such that the play device performs play.

After receiving the MPD sent by the DASH device, the control device sends the MPD to the play device. After receiving the MPD, the play device may acquire, according to address information in the MPD, a corresponding movie segment from a DASH device specified in the MPD. After receiving a request of playing the movie segment from the play device, the DASH device sends a movie segment of a corresponding bit rate according to a network status.

It should be noted that, step 704 is an optional function of the DASH device. For example, in a case of only downloading but not playing a movie, the DASH device only needs to complete the DASH task assigned by the control device.

The foregoing describes briefly a basic structure and function of the DASH device in this embodiment using a DASH technology as an example. In this embodiment, the method performed by the DASH device in a movie play process may be combined with related content in the foregoing steps 701 to 704 and steps 401 to 405.

Various home devices may all serve as the DASH device in this embodiment of the present disclosure. It should be noted that, if the DASH device itself has a control function, the DASH device may also simultaneously serve as the control device described above. That is, a physical device may have both a control function and a DASH function.

The mobile phone in FIG. 5 may also serve as the DASH device in this embodiment of the present disclosure. Correspondingly, the memory 501 is configured to store a program or instruction required for implementing steps 701 to 704. The processor chip 502 is configured to read and execute a program or instruction in the processor chip 502 in order to complete the foregoing steps 701 to 704. In a process of performing steps 701 to 704, the processor chip 502 communicates with the control device and the play device using the radio frequency transceiving chip 503 and the antenna 504. Certainly, the foregoing function of the radio frequency transceiving chip 503 and antenna 504 may also be completed using the WIFI/BLUETOOTH module (including an antenna) 505 or another similar structure.

Based on the foregoing descriptions of the implementation manners, a person skilled in the art may clearly understand that the present disclosure may be implemented by software in addition to a necessary hardware platform. Based on such an understanding, all or the part of the technical solutions of the present disclosure contributing to the technology in the background part may be implemented in the form of a software product. The computer software product may be stored in a storage medium, such as a read-only memory (ROM)/random access memory (RAM), a magnetic disk, or an optical disc, and includes several instructions for instructing a computer device (which may be a PC, a server, or a network device) to execute the methods described in the embodiments or some parts of the embodiments of the present disclosure.

The foregoing descriptions are merely exemplary specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A control device configured to control media content distribution in a home network, wherein the home network comprises the control device, a media play device, and multiple media distribution devices, and wherein the control device comprises:
    a network interface;
    a memory; and
    a processor,
    wherein the network interface and the memory are coupled to the processor,
    wherein the network interface is configured to communicate with the media play device and the media distribution devices,
    wherein the memory is configured to store a computer executable instruction, and
    wherein the processor is configured to execute the computer executable instruction in order to complete the following operations:
        determine that a task needs to be executed, wherein the task is distributing a media content to the media play device;
        acquire device information of the multiple media distribution devices;
        select at least one available media distribution device from the multiple media distribution devices according to the device information, wherein the available media distribution device is configured to process the media content such that the media content has an adaptive media stream format suitable for the media play device; and
        assign a child task to each of the available media distribution devices when there are multiple available media distribution devices,
    wherein the child task instructs each of the available media distribution devices to process at least one segment of the media content such that the multiple available media distribution devices jointly process the media content,
    wherein the home network is a digital living network alliance (DLNA) network,
    wherein the control device communicates with the media play device and the media distribution devices using a dynamic adaptive streaming over hypertext transfer protocol (DASH) protocol,
    wherein assigning the child task to each of the available media distribution devices comprises sending a uniform resource identifier fragment of the at least one segment of the media content to each of the available media distribution devices,
    wherein the uniform resource identifier fragment of each segment of the media content comprises range information of the segment of the media content and a first address of the segment of the media content, wherein the range information is used to indicate a range of the task that needs to be processed by the available media distribution device, and wherein the first address of the segment of the media content is used to indicate a storage address of the segment of the media content.

2. The control device according to claim 1, wherein determining that the task needs to be executed comprises:
monitoring the multiple media distribution devices;
acquiring a data packet from a first media distribution device of the media distribution devices when the first media distribution device starts to download the data packet;
determining whether the data packet carries metadata of the media content; and
determining that the task needs to be executed when the data packet carries the metadata of the media content.

3. The control device according to claim 2, wherein the metadata comprises second address information and length information of the media content, and wherein the second address information is used to indicate a storage address of the media content.

4. The control device according to claim 2, wherein the data packet carries the metadata of the media content, and wherein determining that the task needs to be executed further comprises:
sending a download command to the first media distribution device; and
determining that another task needs to be executed when a request for continue playing is received from the media play device or when a preset first time period arrives but no request for stop playing is received from the media play device.

5. The control device according to claim 1, wherein determining that the task needs to be executed comprises determining, according to a message sent by one media distribution device of the multiple media distribution devices, that the task needs to be executed.

6. The control device according to claim 1, wherein assigning the child task to each of the available media distribution devices further comprises:
dividing the media content into at least a first part and a second part;
assigning at least one segment of the first part to each of the available media distribution devices; and
assigning at least one segment of the second part to each of the available media distribution devices when a request for continuing assigning the task is received from the media play device or when a preset second time period arrives but no request for stopping assigning is received from the media play device,
wherein assigning at least one segment of the first part or the second part to each of the available media distribution devices comprises sending a uniform resource identifier fragment of the at least one segment of the media content of the first part or the second part to each of the available media distribution devices,
wherein the uniform resource identifier fragment of each segment of the media content comprises range information of the segment of the media content of the first part or the second part and a first address of the segment of the media content,
wherein the range information is used to indicate a range of the task that needs to be processed by the available media distribution device, and wherein the first address of the segment of the media content is used to indicate a storage address of the segment of the media content of the first part or the second part.

7. The control device according to claim 1, wherein the processor is further configured to execute the computer executable instruction in order to complete the following operations:
receive, from each of the available media distribution devices, a description file of the at least one segment of the media content, wherein the description file comprises third address information of the at least one segment of the media content that has been processed, wherein the at least one segment of the media content that has been processed is generated by the available media distribution device according to the segment of the media content and that has the adaptive media stream format suitable for the media play device, and wherein the third address information is used to indicate a storage address of the at least one segment of the media content that has been processed; and
send all the description files to the media play device such that the media play device may play the media content.

8. The control device according to claim 1, wherein the device information comprises at least one of a device status, a device type, a device capability, a use frequency of a user, and a device priority.

9. A non-transitory computer readable medium configured to control media content distribution in a home network, wherein the home network comprises a control device, a media play device, and multiple media distribution devices, wherein the non-transitory computer readable medium comprises a non-volatile computer readable storage medium, wherein the non-volatile computer readable storage medium is configured to store a computer executable instruction, and wherein when a processor of the control device executes the computer executable instruction, the control device is configured to perform the following operations:
determine that a task needs to be executed, wherein the task is distributing a media content to the media play device;
acquire device information of the multiple media distribution devices;
select at least one available media distribution device from the multiple media distribution devices according to the device information, wherein the available media distribution device is configured to process the media content such that the media content has an adaptive media stream format suitable for the media play device; and
assigning a child task to each of the available media distribution devices when there are multiple available media distribution devices,
wherein the child task instructs each of the available media distribution devices to process at least one segment of the media content such that the multiple available media distribution devices jointly process the media content,
wherein the home network is a digital living network alliance (DLNA) network,
wherein the control device communicates with the media play device and media distribution device using a dynamic adaptive streaming over hypertext transfer protocol (DASH) protocol,
wherein assigning the child task to each of the available media distribution devices comprises sending a uniform resource identifier fragment of the at least one segment of the media content to each of the available media distribution devices, wherein the uniform resource identifier fragment of each segment of the media content comprises range information of the segment of the media content and a first address of the segment of the media content, wherein the range information is used to indicate a range of the task that needs to be processed by the available media distribution device, and wherein the first address of the segment of the media content is used to indicate a storage address of the segment of the media content.

10. The non-transitory computer readable medium according to claim 9, wherein determining that the task needs to be executed comprises:

monitoring the multiple media distribution devices;

acquiring a data packet from a first media distribution device of the media distribution devices when the first media distribution device starts to download the data packet;

determining whether the data packet carries metadata of the media content; and determining that the task needs to be executed when the data packet carries the metadata of the media content.

11. The non-transitory computer readable medium according to claim 10, wherein the metadata comprises second address information and length information of the media content, and wherein the second address information is used to indicate a storage address of the media content.

12. The non-transitory computer readable medium according to claim 10, wherein the data packet carries the metadata of the media content, and wherein determining that the task needs to be executed further comprises:

sending a download command to the first media distribution device; and determining that another task needs to be executed when a request for continuing playing is received from the media play device, or when a preset first time period arrives but no request for stopping playing is received from the media play device.

13. The non-transitory computer readable medium according to claim 9, wherein determining that the task needs to be executed comprises determining, according to a message sent by one media distribution device of the multiple media distribution devices, that the task needs to be executed.

14. The non-transitory computer readable medium according to claim 9, wherein assigning the child task to each of the available media distribution devices comprises:

dividing the media content into at least a first part and a second part;

assigning at least one segment of the first part to each of the available media distribution devices; and assigning at least one segment of the second part to each of the available media distribution devices when a request for continuing assigning the task is received from the media play device, or when a preset second time period arrives but no request for stopping assigning is received from the media play device, wherein assigning at least one segment of the first part or the second part to each of the available media distribution devices comprises sending a uniform resource identifier fragment of at least one segment of the media content of the first part or the second part to each of the available media distribution devices, wherein the uniform resource identifier fragment of each segment of the media content comprises range information of the segment of the media content of the first part or the second part, and a first address of the segment of the media content, wherein the range information is used to indicate a range of the task that needs to be processed by the available media distribution device, and wherein the first address of the segment of the media content is used to indicate a storage address of the segment of the media content of the first part or the second part.

15. The non-transitory computer readable medium according to claim 9, wherein when executing the computer executable instruction, by the processor, the control device is further configured to perform the following operations:

receive, from each of the available media distribution devices, a description file of the at least one segment of the media content, wherein the description file comprises third address information of the segment of the media content that has been processed, wherein the segment of the media content that has been processed is generated by the available media distribution device according to the segment of the media content and has the adaptive media stream format suitable for the media play device, and wherein the third address information is used to indicate a storage address of the segment of the media content that has been processed; and send all the description files to the media play device such that the media play device may play the media content.

16. The non-transitory computer readable medium according to claim 9, wherein the device information comprises at least one of a device status, a device type, a device capability, a use frequency of a user, and a device priority.

* * * * *